United States Patent [19]

Dadel et al.

[11] Patent Number: 5,720,374
[45] Date of Patent: Feb. 24, 1998

[54] BACKFILL PRESSURE CONTROL VALVE FOR A ROTATING CLUTCH

[75] Inventors: Martin Robert Dadel, Indianapolis; Charles Francis Long, Pittsboro; Robert Clinton Utter, Indianapolis, all of Ind.

[73] Assignee: General Motors Corporation, Detroit, Mich.

[21] Appl. No.: 696,289

[22] Filed: Aug. 13, 1996

[51] Int. Cl.⁶ .............................................. F16D 25/0638
[52] U.S. Cl. ........................ 192/85 R; 192/109 F
[58] Field of Search .................... 192/85 R, 85 AA, 192/109 F, 106 F, 103 FA, 105 F

[56] References Cited

U.S. PATENT DOCUMENTS

| | | | |
|---|---|---|---|
| 2,163,203 | 6/1939 | Kegresse | 192/103 FA |
| 4,308,940 | 1/1982 | Cadee | 192/103 FA |
| 4,502,582 | 3/1985 | Lech et al. | 192/106 F X |
| 5,535,865 | 7/1996 | Haka et al. | 192/85 AA X |

*Primary Examiner*—Rodney H. Bonck
*Attorney, Agent, or Firm*—Donald F. Scherer

[57] ABSTRACT

A rotating clutch has a feed passage that is maintained at a predetermined pressure by a backfill control valve during periods of clutch disengagement when the clutch apply chamber is not pressurized. The valve is slidably disposed in a stationary housing in fluid communication between a pressure source and the apply chamber of the clutch. When the pressure source is reduced below a predetermined level, the valve is positioned to prevent the pressure in the passage from decreasing below the predetermined level while exhausting the clutch apply chamber. When clutch actuation is desired, the pressure source increases to open the backfill valve. With the valve opened by pressure, the fluid pressure is supplied to the clutch apply chamber thereby applying the clutch. The valve is positioned in the housing to admit pressurized fluid from the source to the clutch apply chamber while disconnecting the apply chamber from exhaust when clutch apply is required.

1 Claim, 4 Drawing Sheets

5,720,374

BACKFILL PRESSURE CONTROL VALVE FOR A ROTATING CLUTCH

TECHNICAL FIELD

This invention relates to valve mechanisms for controlling the fluid pressure in a clutch feed passage.

BACKGROUND OF THE INVENTION

Automatic shifting power transmissions require the engagement of friction clutches to make ratio interchanges during operation. Generally, in such transmissions, one clutch is being engaged while another clutch is being simultaneously disengaged. The timing of the engagement and disengagement of these clutches is important to the development of smooth shifts.

One method of improving the consistency of clutch overlap, that is the shift overlap, is to maintain some pressure in the clutch hydraulic circuit when the clutch is disengaged. This prevents air from entering the clutch apply chamber as well as the feed passages for the clutch. By eliminating the compressible air, the fill time for the clutch cavity is more consistent thereby providing smoother ratio changes.

In an effort to improve the clutch fill time, a backfill approach has been undertaken in many transmissions. In the backfilling approach, the feed passages, as well as the clutch apply chambers, are maintained at a predetermined hydraulic pressure when no rotation occurs. However, when the clutch is rotating and disengaged, centrifugal pressure builds up within the apply chamber such that a balancing chamber is required to prevent the clutch from drifting on or engaging inadvertently. The balance chamber requires additional hardware to accomplish the purpose. Thus, the backfilling approach worked quite well in stationary friction members, such as brakes, however, requires additional hardware in the case of rotating clutches.

One other scheme for preventing the drift-on engagement for a rotating clutch is to incorporate return springs which have a high preset load. This, while eliminating much of the centrifugal force, requires significantly higher engagement pressures during clutch operation. Therefore, both of the above solutions to clutch fill time reduction increase the cost and weight of the transmission.

SUMMARY OF THE INVENTION

It is an object of the present invention to provide an improved clutch backfilling system.

In one aspect of the invention, a backfill valve is located within a stationary housing to control fluid pressure in a clutch while permitting exhausting of the clutch apply chamber.

In another aspect of this invention, a spool valve is installed in the hydraulic feed passage for a rotating clutch. In this arrangement, the valve is located sufficiently close to the clutch so that a majority of the clutch passage volume is between the valve and the control system. Thus, the fluid pressure in the feed passage is maintained at a minimum value.

In a further aspect of this invention, the feed passage is maintained at a low pressure during clutch disengagement, a spring requiring slightly higher pressure prevents the opening of a backfill valve to ensure that the rotating clutch is exhausted through the backfill valve to a transmission sump. In this control arrangement, when the clutch is to be engaged, the clutch feed pressure increases to a level above the spring force such that the valve opens to permit pressurized fluid to be communicated with the clutch apply chamber and simultaneously disconnecting the clutch apply chamber from the exhaust.

In accordance with the above object and aspects, clutchfill time consistency is improved thereby improving shift quality; and the elements required for clutch backfilling are eliminated thereby reducing the weight and complexity of the transmission resulting in improved fuel economy and reduction in the axial length of the transmission.

DESCRIPTION OF AN EXEMPLARY EMBODIMENT

Figure 1:
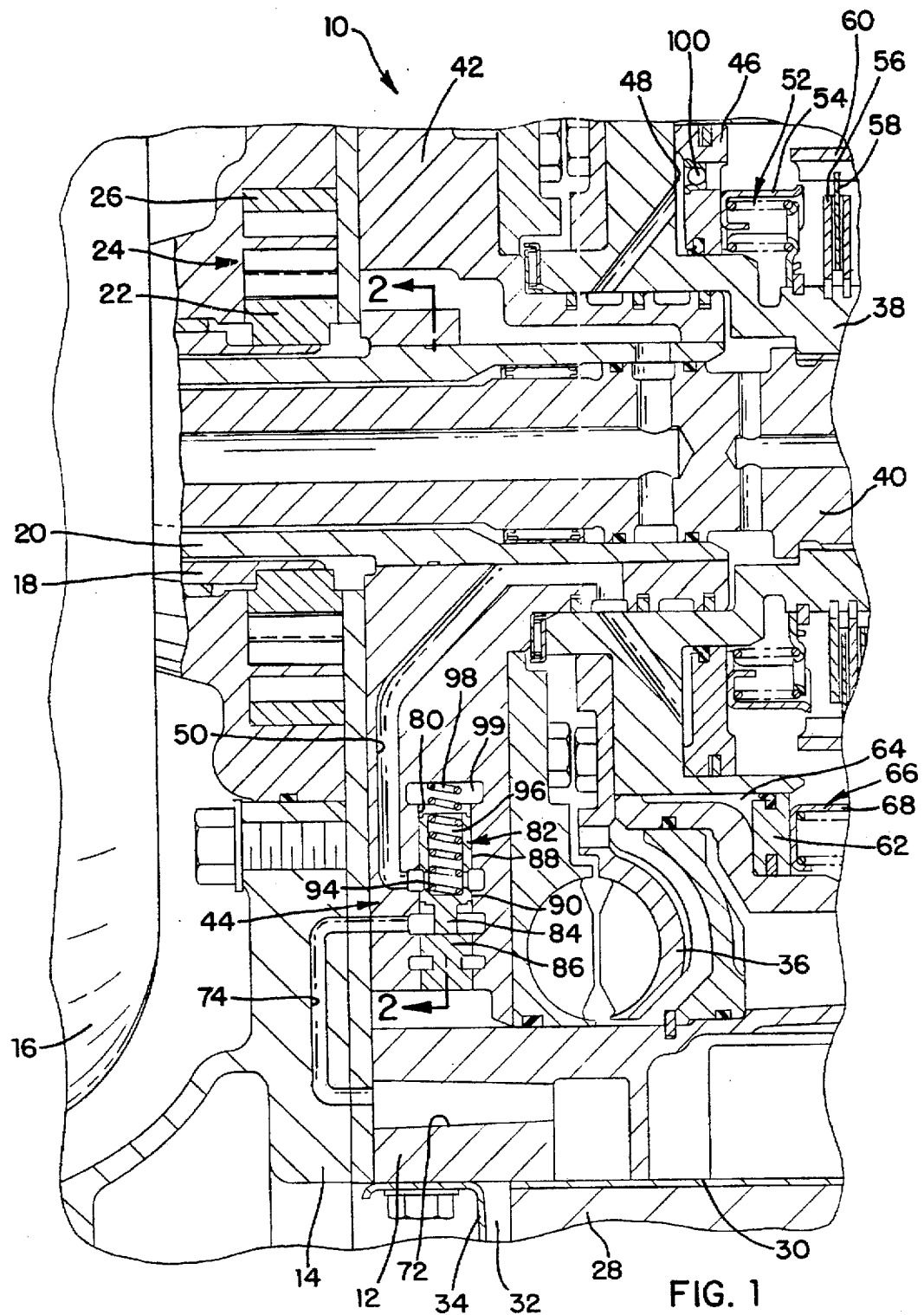
FIG. 1 is a cross-sectional elevational view of a portion of a transmission incorporating the present invention.
Figure 2:
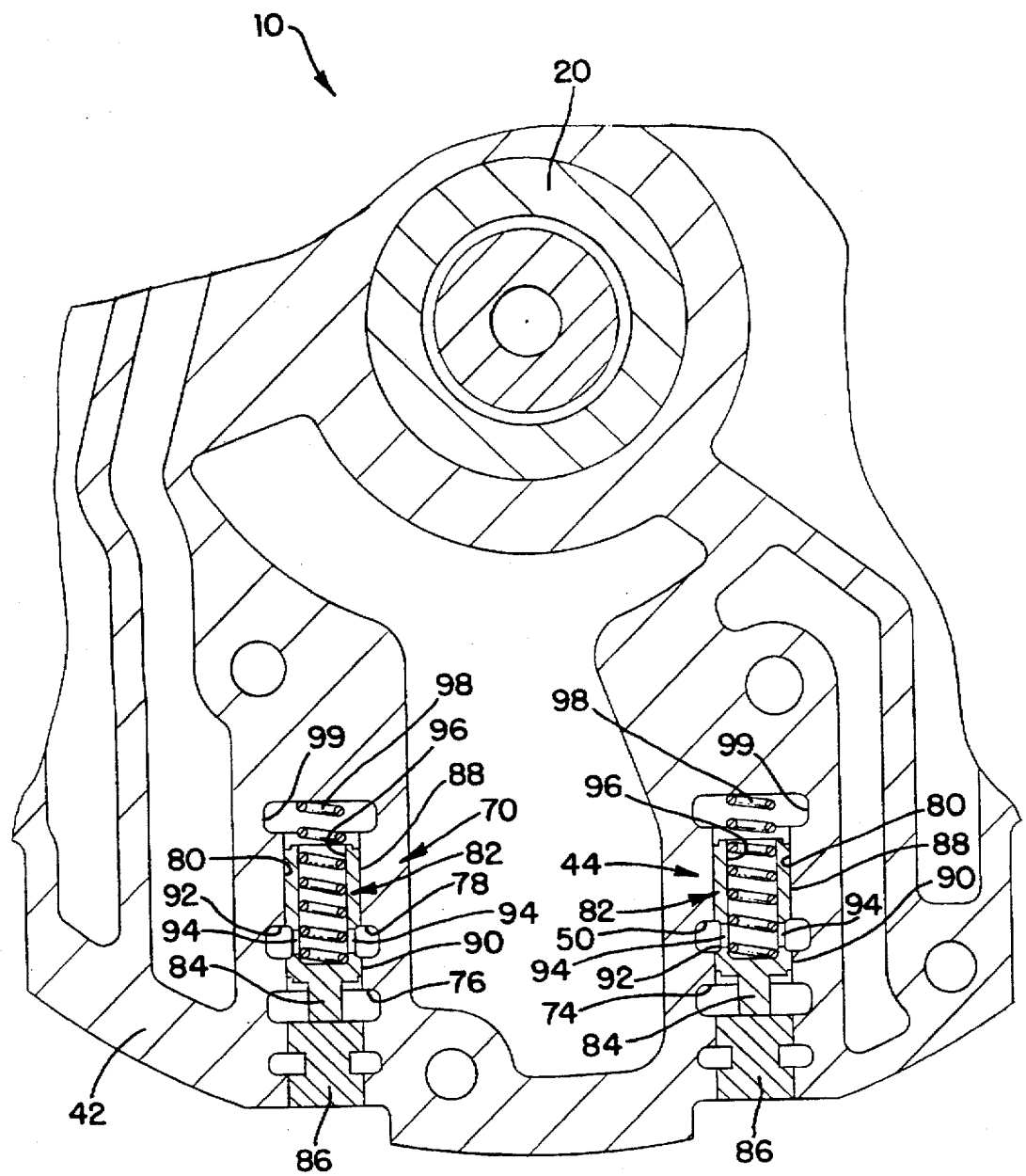
FIG. 2 is a sectional view taken along line 2—2 of FIG. 1.

Referring to the drawings, wherein like characters represent the same or corresponding parts throughout the several views, there is seen in FIGS. 1 and 2, particularly, a transmission assembly 10 having a transmission housing 12 and a torque converter housing 14. The torque converter housing 14 surrounds a conventional torque converter 16 which includes a pump drive shaft 18 and a stator support shaft 20. The pump drive shaft 18 drives an inner gear 22 of a gear pump assembly 24. The inner gear 22 drives an outer gear 26 in a well known manner such that fluid is delivered under pressure to a control valve assembly 28 which is secured to a lower surface 30 of the transmission housing 12.

The control valve assembly 28 is disposed within a transmission sump 32 which vents to atmosphere in a conventional manner through the transmission housing 12. The sump 32 is enclosed by in a reservoir pan 34 in a conventional manner. The control valve assembly 28 receives fluid pressure from the pump assembly 24 for delivery to various components within the transmission. One such component, a hydraulic retarder assembly 36, is useful when vehicle speed reduction is desired.

Other components which require fluid pressure are clutch assemblies which are engaged and disengaged to control drive ratios or gear ratios within a transmission. The clutch assemblies generally include a clutch housing 38 which is secured to be driven by a transmission input shaft 40 which is driven by the output of the torque converter 16. The input shaft 40 is rotatably supported within the stator shaft 20. The clutch housing 38 is rotatably supported on a support housing 42 in which a backfill valve 44 is disposed.

The clutch housing 38 slidably supports a clutch piston 46 in an apply chamber 48. Fluid pressure is delivered to the apply chamber through a clutch apply passage 50 formed in the housing 42 and in the clutch housing 38. The piston 46 operates against a return spring assembly 52 which, in the disengaged position shown, holds a pressure plate or disc 54 out of engagement with a clutch plate 56. The clutch plate 56 is splined to the clutch housing 38 and therefore rotates the clutch housing.

A second clutch plate 58 is splined to a hub 60 for connection with a gear, not shown. A plurality of the clutch plates 56 and 58 are interspersed and will be engaged frictionally by the piston 46 when the chamber 48 is pressurized. The operation of these clutches is well known such that a more thorough description of their operation is not deemed necessary.

The clutch housing 38 also slidably supports a piston 62 and cooperates therewith to form an apply chamber 64. The clutch piston 62 operates on a return spring assembly 66 and an apply plate 68 in a manner similar to that as described above for the clutch piston 46. Pressurization of the chamber 64 will result in the clutch piston 62 being moved axially to engage another set of clutch discs, not shown.

Generally, during transmission operation, there is at least one drive ratio where the clutch piston 46 will be disengaged while the clutch piston 62 is engaged and vice versa. To control this shift overlap or shift timing, it is necessary to control the pressure within the clutch apply chambers 48 and 64 with some precision. This is accomplished with the help of the backfill control valve 44 which controls the pressure fluid delivery to chamber 48 and another backfill control valve 70, seen in FIG. 2, which controls the direct delivery of fluid pressure to the apply chamber 64.

The control valve assembly 28 delivers fluid through a passage 72 to a clutch feed passage 74 which is connected to the backfill control valve 44. The backfill control valve, when sufficient pressure present in the feed passage 74, will permit distribution of fluid to the clutch apply passage 50 and therefor to the apply chamber 48. The backfill valve 70 has a clutch feed passage 76 and a clutch apply passage 78 communicating therewith.

The backfill control valves 44 and 70 are identical in construction such that the valve elements will be denoted with the same character designation and only the operation of valve 44 will be described.

Each backfill control valve 44 and 70 includes a valve bore 80 in which is slidably disposed a valve spool 82. The valve spool 82 has a nose or extension portion 84 which abuts a plug 86 secured in the housing 42. The valve spool 82 has two valve lands 88 and 90 which combine in a sealing relationship with the valve bore 80. The valve lands 88 and 90 are separated by a valley 92 in which is formed a plurality of apertures 94. The apertures 94 communicate with a spring chamber 96 formed on the inner portion of the valve spool 82. The spring chamber 96 encloses a valve spring 98 which urges the valve spool 82 in a direction such that the extension 84 abuts the plug 86. The apertures 94 permit fluid communication between the clutch apply passage 50 and the spring chamber 96 in the spring set position of the valves as shown in FIGS. 1, 2 and 3.

The spring chamber 96 is connected to an exhaust port or chamber 99 which permits fluid to be returned via passages not shown to the sump 32. As previously mentioned, the sump 32 is connected with ambient conditions through conventional vent passages formed in the transmission housing 12.

Each clutch piston 46 and 62 has a conventional ball dump valve assembly 100, such as that shown in the piston 46. The operation of ball dump valves is well known. These valves are utilized to permit the exhausting of the clutch apply chamber, such as chamber 48, whenever the clutch is to be disengaged. When the pressure in the clutch apply chamber is reduced during clutch disengagement, the ball dump valve will respond to centrifugal forces imposed on the ball by the rotating clutch so as to open the clutch chamber to the exhaust side of the pressure plate thereby exhausting the clutch and all passages connected therewith. Thus, during clutch disengagement, the ball dump valve assembly 100 will permit exhausting of the clutch apply chamber 48.

Figure 3:
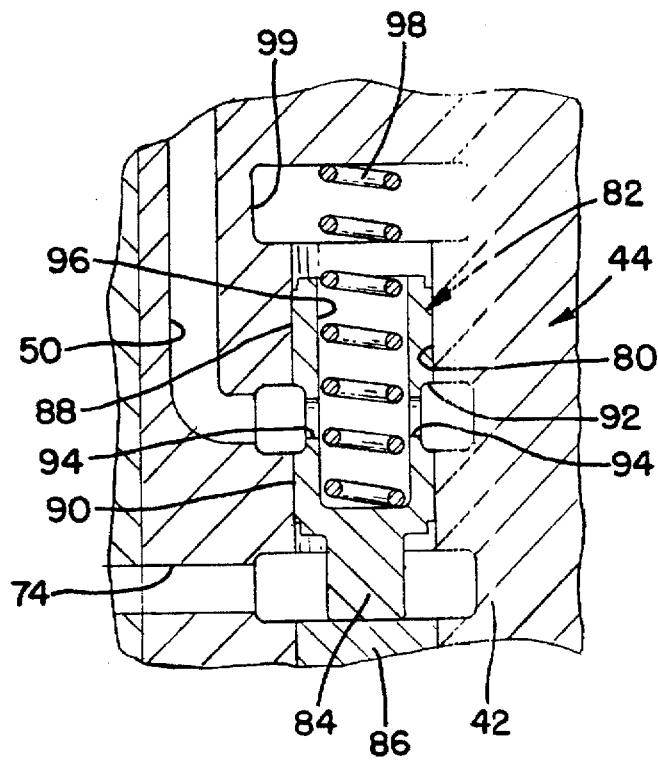
FIG. 3 is an enlarged portion of the backfill valve shown in FIGS. 1 and 2 depicting the valve in one mode of operation.

However, as seen in FIGS. 1, 2 and 3, the valve land 90 is positioned to prevent fluid communication between the feed passage 74 and the apply passage 50, in the case of valve 44, and between the feed passage 76 and the apply passage 78, in the case of valve 70. Thus, the feed passages 74 and 76 can be maintained at a pressure above that found in the apply passage 50.

In the present invention, it has been found desirable to maintain the pressure level in this passage at approximately 2 psi which is a pressure generally found in loop circuits within the transmission. Thus, the feed passages 74 and 76 are pressurized at a low value with a substantially incompressible fluid thereby requiring only the passage between the valve 44 and the apply chamber 48 to be filled and pressurized when clutch engagement is desired.

Figure 4:
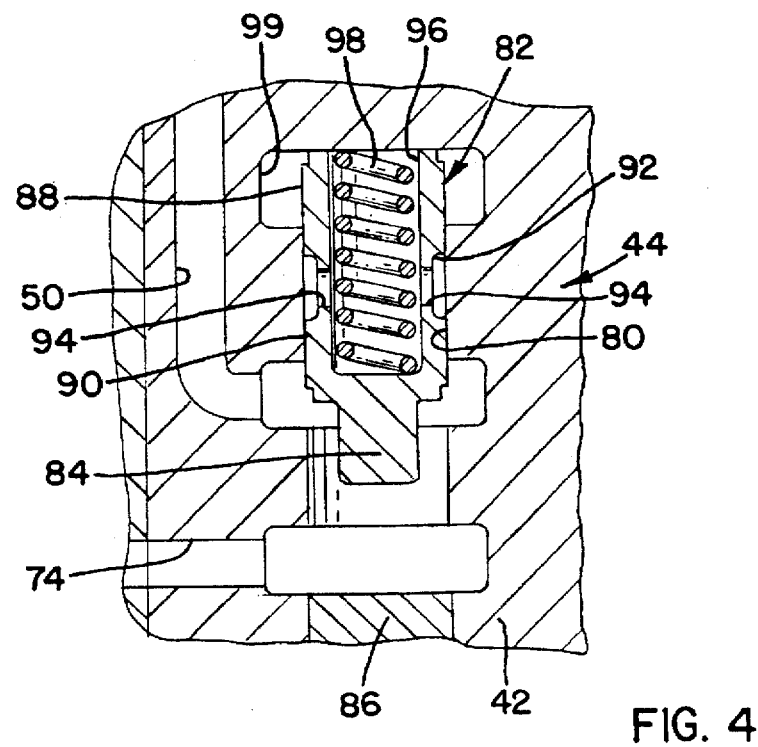
FIG. 4 is a view similar to FIG. 3 depicting the valve in another mode of operation.

When clutch engagement is desired, the pressure in passage 74, as seen in FIG. 4, will increase sufficiently to cause the valve spool 82 to be urged upwardly against the spring 98 thereby permitting fluid communication between the clutch feed passage 74 and the clutch apply passage 50. The short clutch apply passage and the volume of the apply chamber will be quickly exhausted of air and filled with pressurized fluid. The pressurized fluid will cause the ball dump valve 100 to seat thereby permitting the clutch to be engaged in a consistent manner. The same operation is true of valve 70 when it is desirable to pressurize the apply chamber 64.

It should be noted in FIG. 4 that the fluid in passage 74 urges the valve spool 82 upward such that the land 90 prevents fluid communication between the passage 50 and the apertures 94 thereby effectively disconnecting the apply chamber 48 from the exhaust chamber 99.

Figure 5:
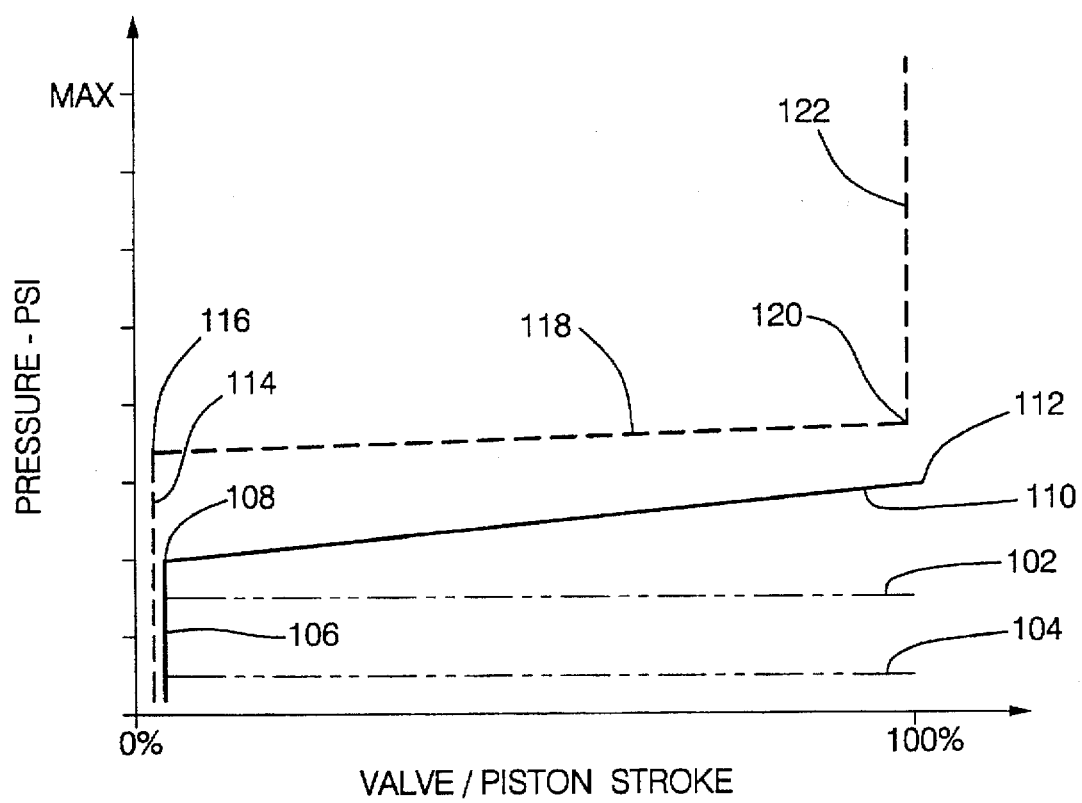
FIG. 5 is a graph showing various operating conditions for the valve and clutch piston.

The effect of the pressures in valve and piston movement can be seen in FIG. 5. The backfill pressure in passage 74 is shown at lines 102 and the exhaust condition in the spring chamber 96 is shown by line 104. When the fluid pressure in passage 74 increases, the pressure will rise along line 106 in FIG. 5 to a point 108 at which the preload of the spring 98 is met. The spring rate will result in the valve stroking along line 110 to the point 112 where the valve spool will bottom in the valve bore 80.

When the valve spool 82 moves sufficiently to begin opening the passage 50 to the passage 74, the pressure in chamber 48 will rise along line 114 to the point 116. The point 116 represents the spring load of the return springs 52. The further increase of pressure in the chamber 48 will result in the clutch return springs being compressed along the line 118 as the pressure within the clutch apply chamber 48 increases to the point 120. At 120, the pressure plate 54 will have fully compressed the clutch plates 56 and 58 such that the pressure within the clutch apply chamber will rise along the line 122 to complete the engagement of the clutch.

Thus, it should be evident from the above description that the clutch engagement and exhausting is controlled, to some extent, by the backfill control valves 44 and 70. The shortness of the clutch apply lines or passages such as 50, permit the control designer to accurately determine the fill time required for the clutch. While the fill time may not be exact from transmission to transmission, the use of adaptive controls, which are well known, will permit the transmission during the short break-in period to overcome any slight discrepancies because of passage differentiation.

What is claimed is:

1. A fill and exhaust apparatus for a rotating fluid operated clutch having a fluid chamber adapted to be pressurized to enforce engagement of the clutch and exhausted to release the clutch, said apparatus comprising:

a rotatable clutch housing enclosing a portion of the chamber;

a shaft drivingly connected with said clutch housing;

a support housing rotatably supporting the clutch housing;

passage means for conducting fluid to and from said chamber including a first passage portion in said clutch housing and a second passage portion in said support housing;

valve means slidably disposed in said second passage portion for movement between engaged and disengaged positions to exhaust said first passage portion in the disengaged position and to permit pressurizing thereof in said engaged position and for retaining a fluid pressure in said second passage portion in said disengaged position.

\* \* \* \* \*